(12) United States Patent
Lee (10) Patent No.: US 11,634,042 B2
(45) Date of Patent: Apr. 25, 2023

(54) APPARATUS AND METHOD FOR CONTROLLING LOCKING OF A CHARGING INLET OF A VEHICLE

(71) Applicants: Hyundai Motor Company, Seoul (KR); Kia Motors Corporation, Seoul (KR)

(72) Inventor: Tae Woo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 114 days.

(21) Appl. No.: 17/038,876

(22) Filed: Sep. 30, 2020

(65) Prior Publication Data

US 2021/0394627 A1 Dec. 23, 2021

(30) Foreign Application Priority Data

Jun. 23, 2020 (KR) .................. 10-2020-0076480

(51) Int. Cl.
*H01R 13/62* (2006.01)
*B60L 53/16* (2019.01)
*H01R 13/639* (2006.01)
*H02J 7/00* (2006.01)

(52) U.S. Cl.
CPC ............ *B60L 53/16* (2019.02); *H01R 13/639* (2013.01); *H02J 7/0047* (2013.01); *H01R 2201/26* (2013.01)

(58) Field of Classification Search
CPC .......... B60L 53/16; B60L 53/22; B60L 53/60; B60L 53/11; B60L 53/14; H01R 13/639; H01R 2201/26; H01R 13/6397; H02J 7/0047; B60Y 2200/91; Y02T 90/12
See application file for complete search history.

(56) References Cited

U.S. PATENT DOCUMENTS

| 9,960,612 | B2 * | 5/2018 | Ono | B60L 55/00 |
|---|---|---|---|---|
| 2016/0052411 | A1 * | 2/2016 | Tanabe | B60L 53/305 320/109 |
| 2016/0375778 | A1 * | 12/2016 | Kwon | B60L 7/18 307/10.1 |
| 2018/0229618 | A1 * | 8/2018 | Lee | B60L 50/13 |
| 2020/0331355 | A1 * | 10/2020 | Choi | H02M 1/4225 |
| 2021/0086646 | A1 * | 3/2021 | Prasad | B60L 53/18 |
| 2021/0138919 | A1 * | 5/2021 | Weber | H01R 13/6205 |
| 2021/0237607 | A1 * | 8/2021 | Chen | H02J 7/00034 |
| 2021/0237610 | A1 * | 8/2021 | Zheng | H02J 7/0031 |

* cited by examiner

Primary Examiner — Abdullah A Riyami
Assistant Examiner — Nelson R. Burgos-Guntin
(74) Attorney, Agent, or Firm — Slater Matsil, LLP (57) ABSTRACT

An apparatus for controlling locking of a charging inlet includes a charging inlet including an input device configured to be provided at a position where pressurization is determined based on a type of a connector of a charging cable and to be engaged with the connector, an on board charger (OBC) configured to generate an inlet unlocking signal when the input device is pressurized by the connector, and a controller configured to unlock the charging inlet when the inlet unlocking signal is received.

20 Claims, 7 Drawing Sheets

APPARATUS AND METHOD FOR CONTROLLING LOCKING OF A CHARGING INLET OF A VEHICLE

CROSS-REFERENCE TO RELATED APPLICATIONS

This application claims the benefit of Korean Patent Application No. 10-2020-0076480, filed in the Korean Intellectual Property Office on Jun. 23, 2020, which application is hereby incorporated herein by reference.

TECHNICAL FIELD

The present disclosure relates to an apparatus for controlling locking of a charging inlet and a method thereof.

BACKGROUND

Recently, use of an electric vehicle traveling using a battery charged using electricity has increased. In general, a charging method of the electric vehicle includes a slow charging method and a fast charging method. Considering that the vehicle is charged by the slow charging method, a connector of a charging cable is locked when being engaged with a charging inlet. Accordingly, when the charging is stopped in a state where the connector of the charging cable and the charging inlet are engaged with each other, there is a situation in which the charging inlet cannot be unlocked until the charging is completed and an unnecessary waiting occurs. Thus, there is a need to develop a technology capable of reducing a charging standby time by controlling the locking of the charging inlet based on the charging method.

SUMMARY

Embodiments of the present disclosure solve problems occurring in the prior art while advantages achieved by the prior art are maintained intact.

An embodiment of the present disclosure provides an apparatus for controlling locking of a charging inlet that is capable of controlling locking of the charging inlet based on a charging method of a vehicle, and a method thereof.

Technical problems solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, an apparatus for controlling locking of a charging inlet includes a charging inlet that includes an input device provided at a position where pressurization is determined based on a type of a connector of a charging cable and is engaged with the connector, an on board charger (OBC) for generating an inlet unlocking signal when the input device is pressurized by the connector, and a controller for unlocking the charging inlet when the inlet unlocking signal is received.

The controller may determine whether an inlet locking mode is entered when the connector and the charging inlet are engaged with each other.

The controller may determine whether the inlet unlocking signal is generated when determining that the inlet locking mode is entered.

The controller may control a relay to be turned on when the input device is pressurized and receive the inlet unlocking signal generated by the on board charger (OBC) to determine generation of the inlet unlocking signal when the on board charger (OBC) detects a voltage change due to the relay being turned on.

The controller may determine a charging method as fast charging when determining the generation of the inlet unlocking signal.

The controller may control the inlet unlocking signal to be transmitted to a locking device.

The controller may control release of the inlet locking mode when determining that the inlet locking mode is not entered or when the inlet unlocking signal is transmitted to the locking device.

The controller may determine whether charging is performed while the inlet locking mode is released.

The controller may re-enter the inlet locking mode to lock the connector not to be separated from the charging inlet when determining that the charging is performed.

The controller may control to maintain the release of the inlet locking mode when determining that the charging is not performed.

According to an embodiment of the present disclosure, a method of controlling locking of a charging inlet includes generating an inlet unlocking signal when the charging inlet including an input device provided at a position where pressurization is determined based on a type of a connector of a charging cable is engaged with the connector and unlocking the charging inlet when the inlet unlocking signal is received.

The method may further include determining whether an inlet locking mode is entered when the connector and the charging inlet are engaged with each other.

Whether the inlet unlocking signal is generated or not may be determined when it is determined that the inlet locking mode is entered.

The input device may be pressurized to control a relay to be turned on, the inlet unlocking signal generated in the on board charger (OBC) may be received when the on board charger (OBC) detects a voltage change due to the relay being turned on, and it may be determined that the inlet unlocking signal is generated.

The charging method may be determined as fast charging when it is determined that the inlet unlocking signal is generated.

The method may further include controlling the inlet unlocking signal to be transmitted to a locking device when it is determined that the inlet unlocking signal is generated.

The method may further include controlling the inlet locking mode to be released when it is determined that the inlet locking mode is not entered or when the inlet unlocking signal is transmitted to the locking device.

The method may further include determining whether charging is performed while the inlet locking mode is released.

The inlet locking mode may be re-entered when it is determined that the charging is performed, to lock the connector not to be separated from the charging inlet.

Maintaining the release of the inlet locking mode may be controlled when it is determined that the charging is not performed.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
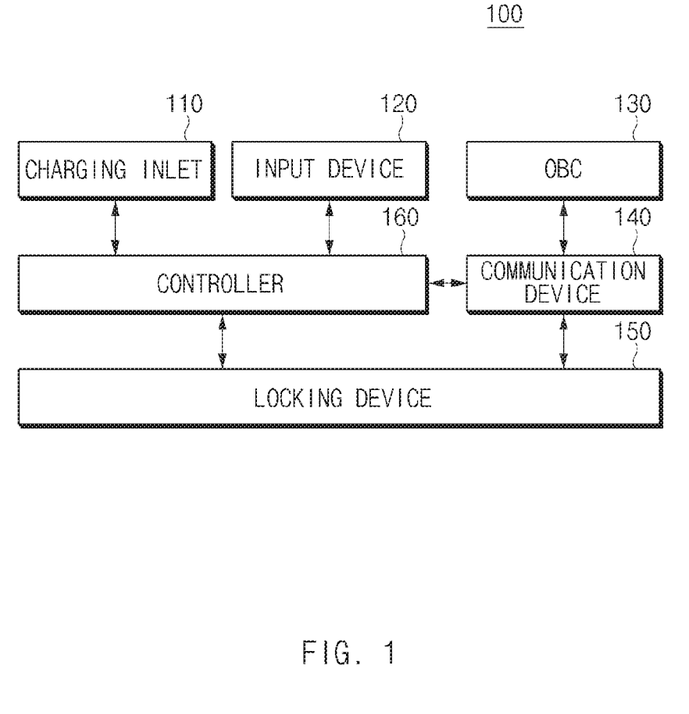
FIG. 1 is a diagram illustrating a configuration of an apparatus for controlling locking of a vehicle charging inlet according to an embodiment of the present disclosure.

FIG. 1 is a diagram illustrating a configuration of an apparatus for controlling locking of a vehicle charging inlet according to an embodiment of the present disclosure.

As illustrated in FIG. 1, an apparatus for controlling locking of a vehicle charging inlet 100 according to an embodiment of the present disclosure may include a charging inlet 110, an input device 120, an OBC 130, a communication device 140, a locking device 150, and a controller 160.

The charging inlet 110 may be connected to a charging cable of a charging outlet to receive electricity. The charging inlet 110 may include a plurality of connection terminals and may be implemented in a DC combo type to allow different types of connectors to be engaged based on a charging method. Here, the DC combo type may be implemented in an integrated form including five AC pins and two DC pins. A more detailed description will be given with reference to FIGS. 2 and 3.

Figure 2:
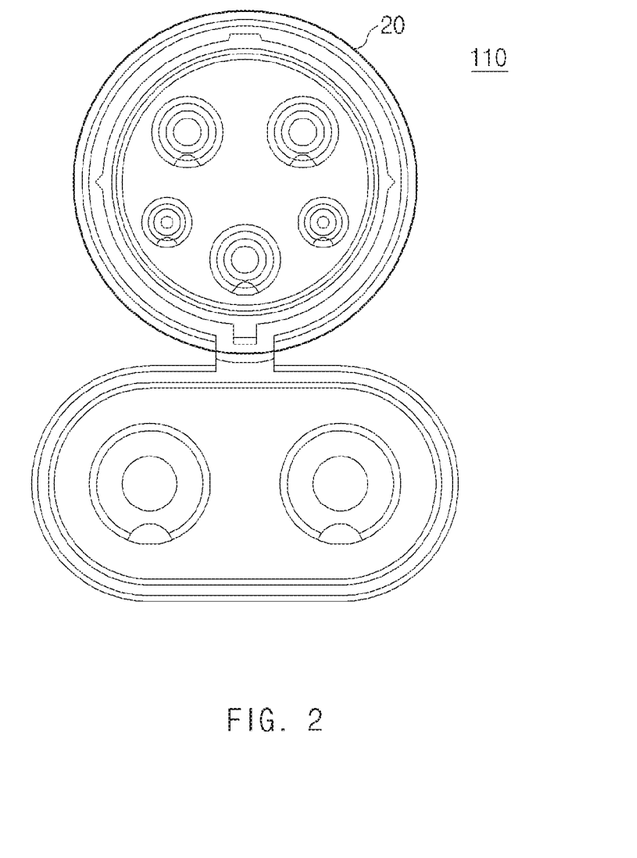
FIG. 2 is a view illustrating a charging inlet engaged when slow charging.
Figure 3:
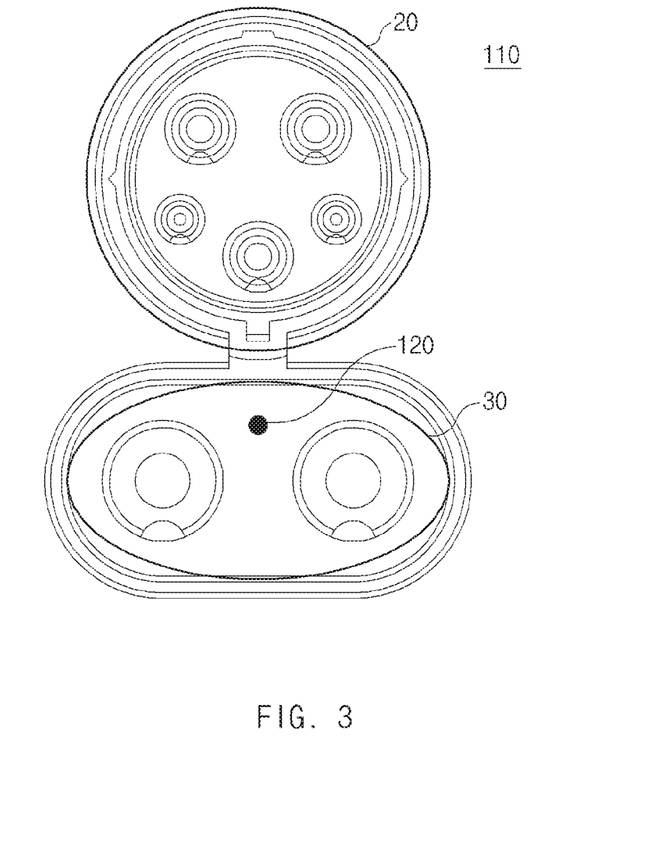
FIG. 3 is a view illustrating a charging inlet and an input device, which are engaged with each other, when fast charging.

FIG. 2 is a view illustrating a charging inlet engaged when slow charging and FIG. 3 is a view illustrating a charging inlet and an input device, which are engaged with each other, when fast charging.

As illustrated in FIG. 2, the charging inlet that is engaged with the connector of the charging cable of the charging outlet when slow charging may include five AC pins 20. As illustrated in FIG. 3, the charging inlet that is engaged with the connector of the charging cable of the charging outlet when fast charging may include five AC pins 20 and two DC pins 30. In embodiments of the present disclosure, the charging method may be determined using characteristics that the two DC pins 30 are not engaged when slow charging but the two DC pins 30 are engaged when fast charging.

The input device 120 may be provided in an area, where the connector of the charging cable which is engaged with the two DC pins is in contact with the charging inlet when fast charging, to allow the charging method to be determined using the characteristics of the connector of the charging cable and the two DC pins being engaged. In addition, the input device 120 may be implemented in a form that is capable of being pressurized when the connector of the charging cable is in contact with the charging inlet. The controller 160 may generate an inlet unlocking signal when the connector of the charging cable is engaged with the charging inlet 110 and the charging inlet 110 is pressurized by the connector. To this end, the input device 120 may be implemented in a form such as a button, a push pin, and the like. According to an embodiment, as illustrated in FIG. 3, although the input device 120 is illustrated as being provided between the two DC pins, the input device 120 is not limited thereto, and the input device 120 may be provided in any area in which the connector is engaged with the charging inlet 110 and is capable of being in contact (pressurized) with the connector.

The on board charger (OBC) 130, which is a charger mounted on a vehicle, may mean a device for charging a battery by converting an AC power supplied from the connector of the charging cable to a direct current (DC). In addition, when the input device 120 is pressurized, a relay is turned on, a voltage is changed due to the relay being turned on, and the OBC may detect the voltage change and generate an inlet unlocking signal.

When the OBC 130 detects the voltage change due to the pressurization of the input device 120, the communication device 140 may transmit the inlet unlocking signal generated by the OBC 130 to the controller 160 through a CAN communication and the inlet unlocking signal may be transmitted to the locking device 150 using a CAN communication. According to an embodiment of the present disclosure, because the OBC 130 communicates using a P-CAN communication method and the locking device 150 communicates using a C-CAN communication method, the communication device 140 may allow the inlet unlocking signal generated by the OBC 130 to be transmitted to the locking device 150 through a gateway (IGPM).

The locking device 150 may be controlled to allow the connector of the charging cable not to be separated from the charging inlet 110 and to maintain the engaged state.

The controller 160 may be implemented by various processing devices such as a microprocessor equipped with a semiconductor chip capable of performing calculation or execution of various instructions and may control an overall operation of the apparatus for controlling locking of the charging inlet according to an embodiment of the present disclosure based on at least one algorithm. In detail, when the inlet unlocking signal is received, the charging inlet may be unlocked.

When it is determined that the connector of the charging cable and the charging inlet 110 are engaged with each other for charging, the controller 160 may supply power to controllers necessary for charging the vehicle. Here, the controllers necessary for charging the vehicle may include devices that are supplied with power using $IG_3$ power and the $IG_3$ power may supply power to a charging circuit using a large capacity battery, a convenience device, and a safety device. For reference, $IG_1$ power may supply power to devices involved in starting an engine and $IG_2$ power may supply power to electrical equipment (e.g., headlamps and heating wires) having a large load other than starting the engine.

When the power is supplied to the controllers necessary for charging the vehicle, the controller 160 determines whether an inlet locking mode is entered. Here, the inlet locking mode may refer to a mode controlling the locking device 150 such that the connector of the charging cable maintains the engaged state with the charging inlet 110 instead of separating from the charging inlet 110.

When it is determined to enter the inlet locking mode, the controller 160 may determine whether the input device 120 is pressurized. A more detailed description will be given with reference to FIGS. 4 and 5.

Figure 4:
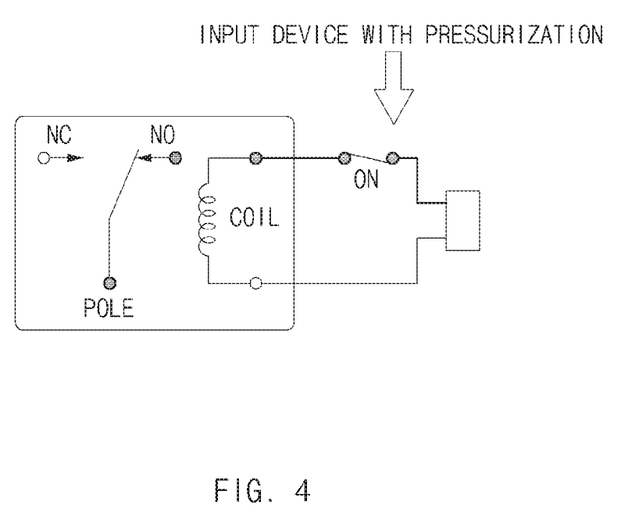
FIGS. 4 and 5 are diagrams schematically illustrating relay operations by pressurization of an input device of embodiments of the present disclosure.
Figure 5:
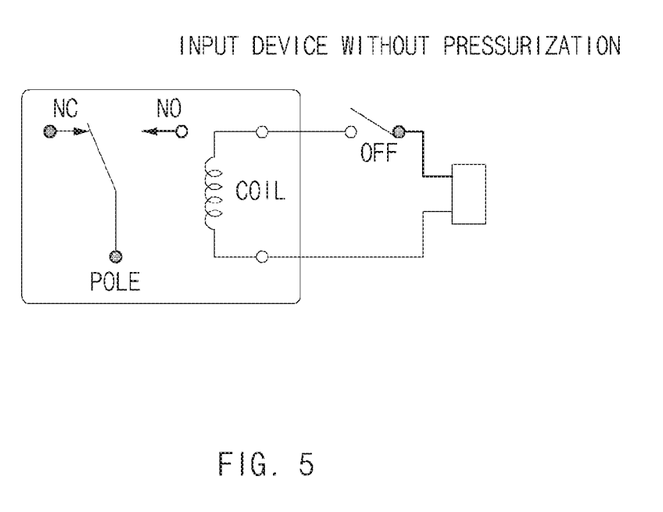

FIGS. 4 and 5 are diagrams schematically illustrating relay operations by pressurization of an input device of embodiments of the present disclosure.

As illustrated in FIG. 4, according to an embodiment of the present disclosure, the controller 160 may be controlled to turn on the relay when the input device 120 is pressurized, the controller 160 may receive the inlet unlocking signal generated in the OBC 130 when the voltage change is detected from the OBC 130 due to the relay being turned on, it may be determined that the inlet unlocking signal is generated when the inlet unlocking signal is received, and the charging method may be determined as the fast charging method. In addition, as illustrated in FIG. 5, the controller 160 may be controlled to turn off the relay when the input device 120 is not pressurized, the OBC 130 may not generate the inlet unlocking signal and the controller 160 may not receive the inlet unlocking signal when the voltage change is not detected from the OBC 130 due to the relay being turned off, the controller 160 may not receive the inlet unlocking signal, it may be determined that the inlet unlocking signal is not generated, and the charging method may be determined as the slow charging method.

When it is determined that the inlet unlocking signal is generated, the controller 160 may control the inlet unlocking signal to be transmitted to the locking device 150. According to an embodiment of the present disclosure, the OBC 130 may transmit the inlet unlocking signal to the controller 160 through the P-CAN communication method and the controller 160 may control the inlet unlocking signal to be transmitted to the locking device 150 in the C-CAN communication method through the gateway (IGMP).

When the inlet unlocking signal is transmitted to the locking device 150, the controller 160 may control the locking mode to be released for a specific time. Here, the release of the locking mode may mean that the controller 160 controls the locking device 150 to allow the connector of the charging cable to be easily separated from the charging inlet 110.

The controller 160 may determine whether charging is performed while the inlet locking mode is released for the specific time. The controller 160 may determine that charging is performed when electricity is normally supplied from the connector of the charging cable to the charging inlet 110. In this case, the inlet locking mode may be re-entered and the controller 160 may control the locking device 150 to allow the connector of the charging cable not to be separated from the charging inlet. In addition, when it is determined that the input device 120 is not pressurized, that is, when it is determined that the charging method is the slow charging method, the controller 160 may control the locking device 150 to allow the connector of the charging cable not to be separated from the charging inlet.

Meanwhile, when it is determined that the electric supply from the connector of the charging cable to the charging inlet 110 is not normally performed while the inlet locking mode is released for the specific time, the controller 160 may determine that the charging is stopped or non-charged and maintain the release of the inlet locking mode. Accordingly, when charging is not performed while the connector of the charging cable is engaged with the charging inlet 110 in the fast charging method, the controller 160 may maintain the release of the inlet locking mode to allow the connector of the charging cable to be easily separated from the charging inlet by a user.

Figure 6:
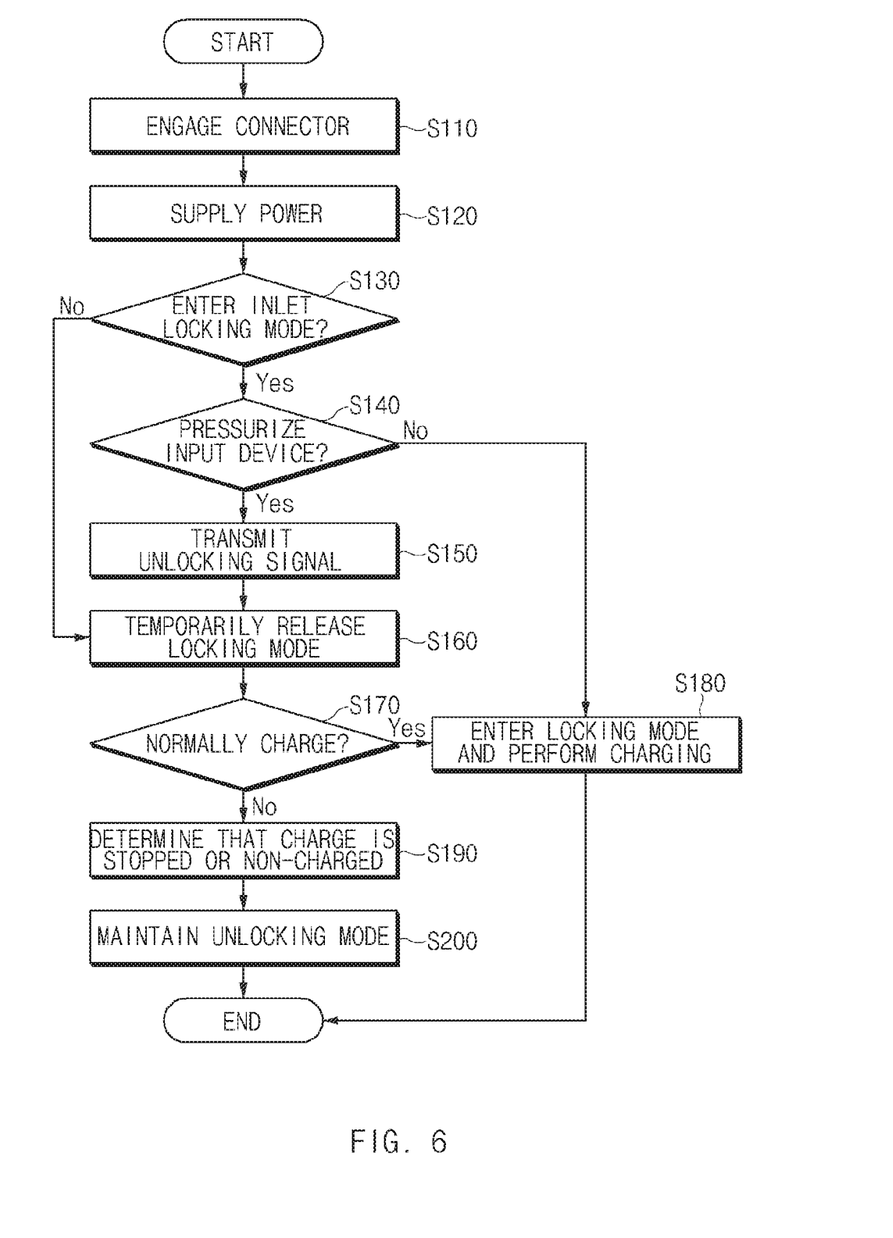
FIG. 6 is a flowchart illustrating a method of locking a vehicle charging inlet according to an embodiment of the present disclosure.

FIG. 6 is a flowchart illustrating a method of locking a vehicle charging inlet according to an embodiment of the present disclosure.

As illustrated in FIG. 6, when the controller 160 determines that the connector of the charging cable and the charging inlet 110 are engaged with each other for charging in S110, the controller 160 may supply power to controllers necessary for charging the vehicle in S120. When power is supplied to the controllers necessary for charging the vehicle, the controller 160 determines whether the inlet locking mode is entered in S130. Here, the inlet locking mode may refer to a mode controlling the locking device 150 such that the connector of the charging cable maintains the engaged state with the charging inlet 110 instead of separating from the charging inlet 110.

When it is determined that the controller 160 enters the inlet locking mode ("Yes" in S130), the controller 160 may determine whether the input device 120 is pressurized in S140. In S140, the controller 160 may determine whether the input device 120 is pressurized to generate an inlet unlocking signal. The detailed description is given with reference to FIGS. 4 and 5.

When the controller 160 determines that the inlet unlocking signal is generated ("Yes" in S140), the controller 160 may control the inlet unlocking signal to be transmitted to the locking device 150 in S150. According to an embodiment of the present disclosure, because the OBC 130 communicates using the P-CAN communication method and the locking device 150 communicates with the C-CAN communication method, the controller 160 may control the communication device 140 to allow the inlet unlocking signal to be transmitted to the locking device 150 through the gateway (IGPM) in S150.

When the inlet unlocking signal is transmitted to the locking device 150, the controller 160 may control the locking mode to be released for a specific time in S160. In S160, the release of the locking mode may mean that the controller 160 controls the locking device 150 to allow the connector of the charging cable to be easily separated from the charging inlet 110 by external pressure.

The controller 160 may determine whether charging is performed while the inlet locking mode is released for the specific time in S170. In S170, the controller 160 may determine that charging is performed when electricity is normally supplied from the connector of the charging cable to the charging inlet 110 ("Yes" in S170). In this case, the connector is re-entered into the inlet locking mode, and the controller 160 may control the locking device 150 not to be separated from the charging inlet in S180. In addition, when the controller 160 determines that the input device 120 is not pressurized ("No" in S140), that is, when it is determined that the charging method is the slow charging method, the controller 160 controls the locking device 150 to allow the connector not to be separated from the charging inlet in S180.

Meanwhile, when the controller 160 determines that electricity is not normally supplied from the connector of the charging cable to the charging inlet 110 while the inlet locking mode is released for the specific time ("No" in S170), the controller 160 may determine that the charging is stopped or non-charged in S190 and may maintain the release of the inlet locking mode in S200. Accordingly, when the charging is not substantially performed while the connector of the charging cable is engaged with the charging inlet 110 in the fast charging method, the controller 160 may maintain the release of the inlet locking, thereby allowing the connector of the charging cable to be easily separated from the charging inlet by the user.

Figure 7:
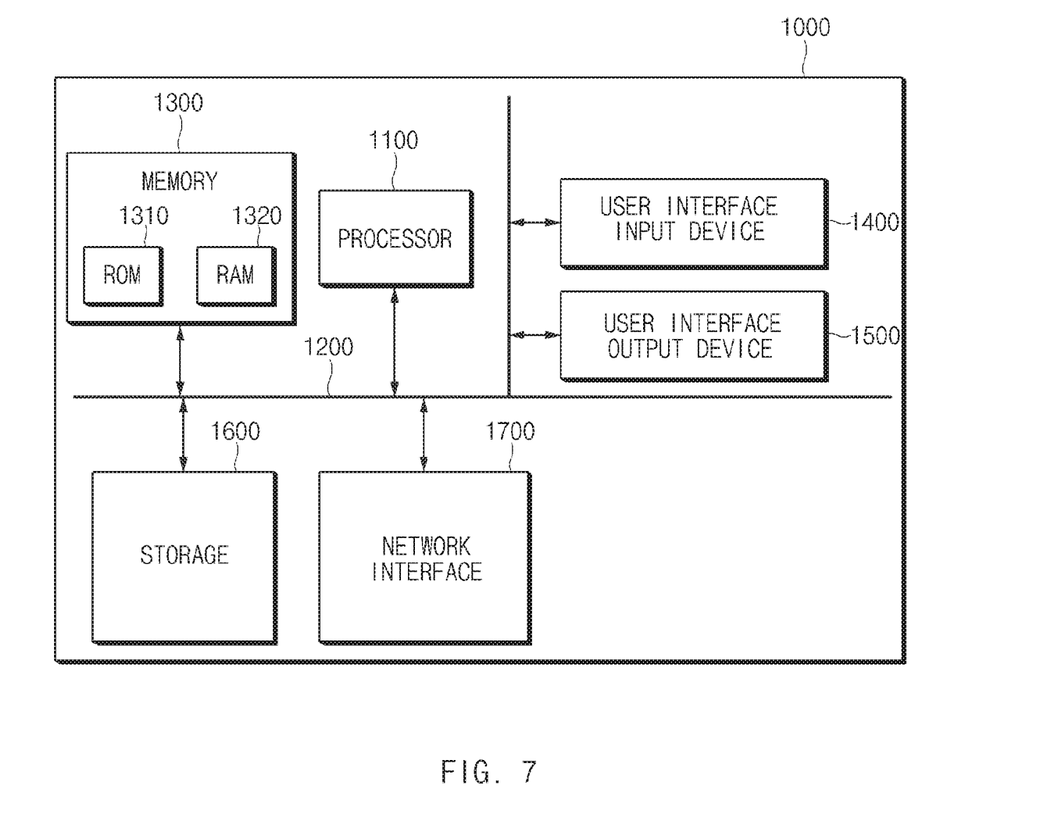
FIG. 7 is a diagram illustrating a configuration of a computing system executing a method according to an embodiment of the present disclosure.

FIG. 7 is a diagram illustrating a configuration of a computing system executing a method according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and/or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus for controlling locking of the charging inlet and the method thereof according to an embodiment of the present disclosure may control the locking of the charging inlet based on the charging method to prevent unnecessary increase in the charging standby time.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling locking of a charging inlet, the apparatus comprising:
the charging inlet including an input device configured to be provided at a position where pressurization is determined based on a type of a connector of a charging cable and to be engaged with the connector;
an on board charger (OBC) configured to generate an inlet unlocking signal when the input device is pressurized by the connector; and
a controller configured to unlock the charging inlet when the inlet unlocking signal is received,
wherein the input device is pressurized when the connector of the charging cable is in contact with a plurality of DC charging pins of the charging inlet.

2. The apparatus of claim 1, wherein the controller is configured to determine whether an inlet locking mode is entered when the connector and the charging inlet are engaged with each other.

3. The apparatus of claim 2, wherein the controller is configured to determine whether the inlet unlocking signal is generated when determining that the inlet locking mode is entered.

4. The apparatus of claim 3, wherein the controller is configured to control a relay to be turned on when the input device is pressurized and receives the inlet unlocking signal generated by the OBC to determine generation of the inlet unlocking signal when the OBC detects a voltage change due to the relay being turned on.

5. The apparatus of claim 4, wherein the controller is configured to determine a charging method as fast charging when determining the generation of the inlet unlocking signal.

6. The apparatus of claim 5, wherein the controller is configured to control the inlet unlocking signal to be transmitted to a locking device.

7. The apparatus of claim 6, wherein the controller is configured to control release of the inlet locking mode when determining that the inlet locking mode is not entered or when the inlet unlocking signal is transmitted to the locking device.

8. The apparatus of claim 7, wherein the controller is configured to determine whether charging is performed while the inlet locking mode is released.

9. The apparatus of claim 8, wherein the controller is configured to re-enter the inlet locking mode to lock the connector not to be separated from the charging inlet when determining that the charging is performed.

10. The apparatus of claim 8, wherein the controller is configured to control to maintain the release of the inlet locking mode when determining that the charging is not performed.

11. A method of controlling locking of a charging inlet, the method comprising:
generating an inlet unlocking signal when the charging inlet including an input device provided at a position where pressurization is determined based on a type of a connector of a charging cable is engaged with the connector; and unlocking the charging inlet when the inlet unlocking signal is received, wherein the input device is pressurized when the connector of the charging cable is in contact with a plurality of DC charging pins of the charging inlet.

12. The method of claim 11, further comprising determining whether an inlet locking mode is entered when the connector and the charging inlet are engaged with each other.

13. The method of claim 12, further comprising determining whether the inlet unlocking signal is generated when it is determined that the inlet locking mode is entered.

14. The method of claim 13, further comprising:
pressurizing the input device to control a relay to be turned on; and
determining the inlet unlocking signal generated in an on board charger (OBC) is received when the OBC detects a voltage change due to the relay being turned on, and it is determined that the inlet unlocking signal is generated.

15. The method of claim 14, wherein a charging method is determined as a fast charging method when it is determined that the inlet unlocking signal is generated.

16. The method of claim 15, further comprising controlling the inlet unlocking signal to be transmitted to a locking device when it is determined that the inlet unlocking signal is generated.

17. The method of claim 16, further comprising controlling the inlet locking mode to be released when it is determined that the inlet locking mode is not entered or when the inlet unlocking signal is transmitted to the locking device.

18. The method claim 17, further comprising determining whether charging is performed while the inlet locking mode is released.

19. The method of claim 18, further comprising re-entering the inlet locking mode to lock the connector not to be separated from the charging inlet when it is determined that the charging is performed.

20. An apparatus comprising:
a charging inlet;
a plurality of AC charging pins within the charging inlet;
a plurality of DC charging pins within the charging inlet;
an input device within the charging inlet and adjacent the plurality of DC charging pins, wherein the input device is pressurized when a connector of a charging cable is in contact with the plurality of DC charging pins of the charging inlet;
an on board charger (OBC) configured to generate an inlet unlocking signal when the input device is pressurized; and
a controller configured to unlock the charging inlet when the inlet unlocking signal is received.

* * * * *